March 30, 1954  W. J. COSMOS  2,673,470
HIGH-SPEED, LOW-VIBRATION DRIVE PULLEY FOR FLAT BELTS
Filed July 30, 1952  2 Sheets-Sheet 1
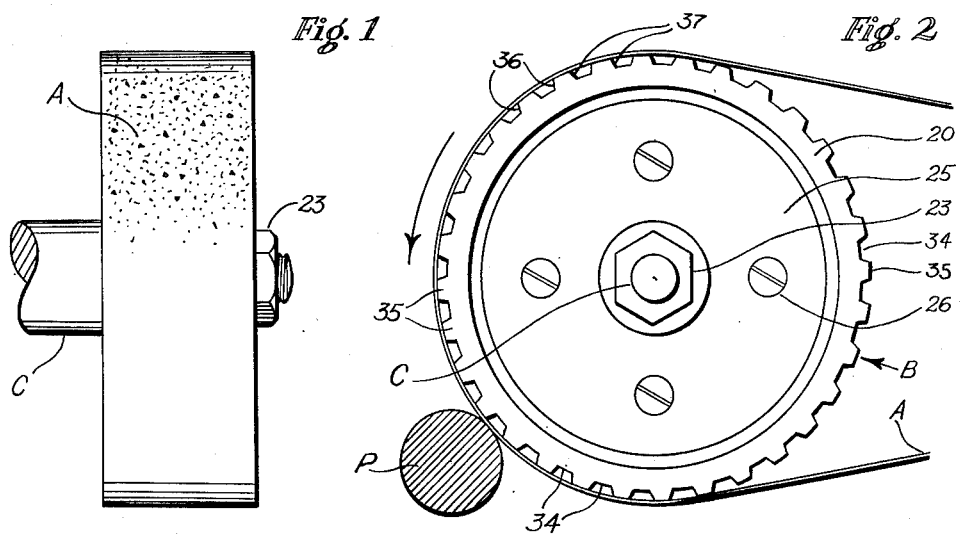
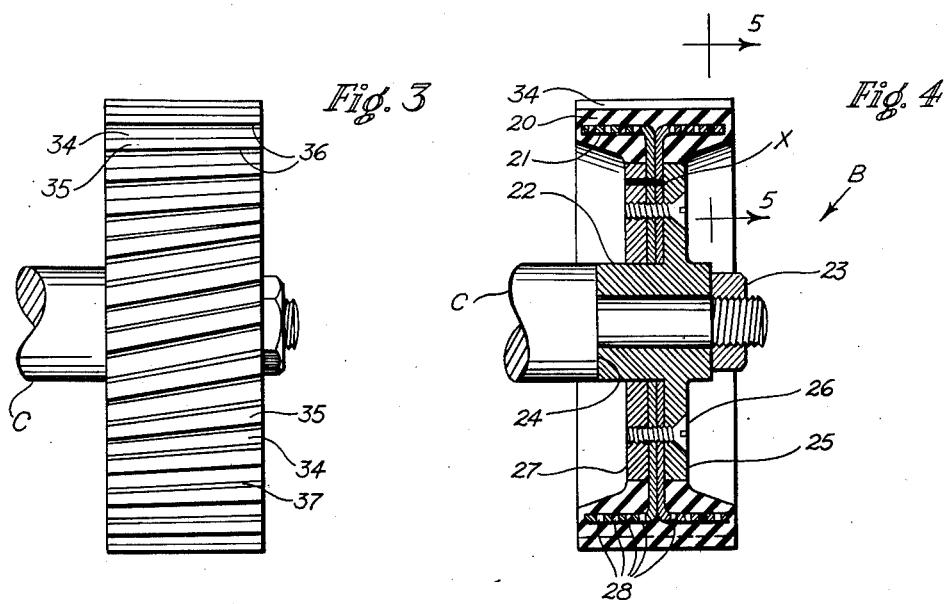
INVENTOR.
WILLIAM J. COSMOS
BY
F. D. Prager
ATT'Y.

March 30, 1954      W. J. COSMOS      2,673,470
HIGH-SPEED, LOW-VIBRATION DRIVE PULLEY FOR FLAT BELTS
Filed July 30, 1952      2 Sheets-Sheet 2
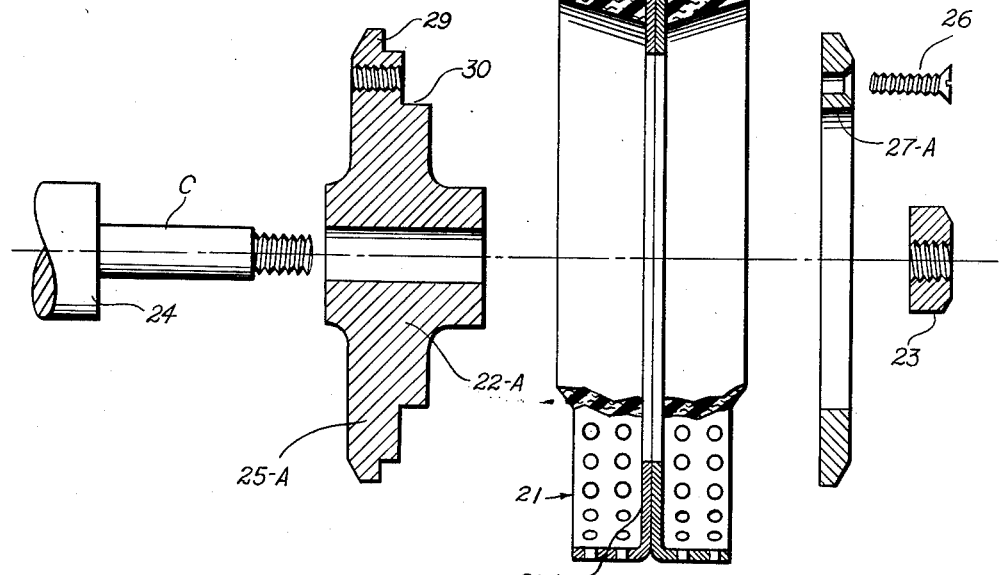
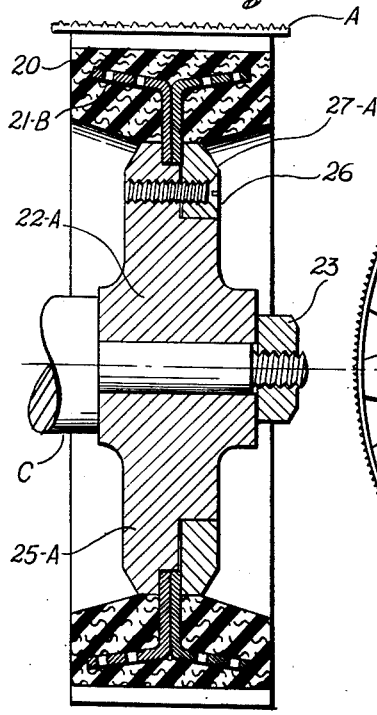
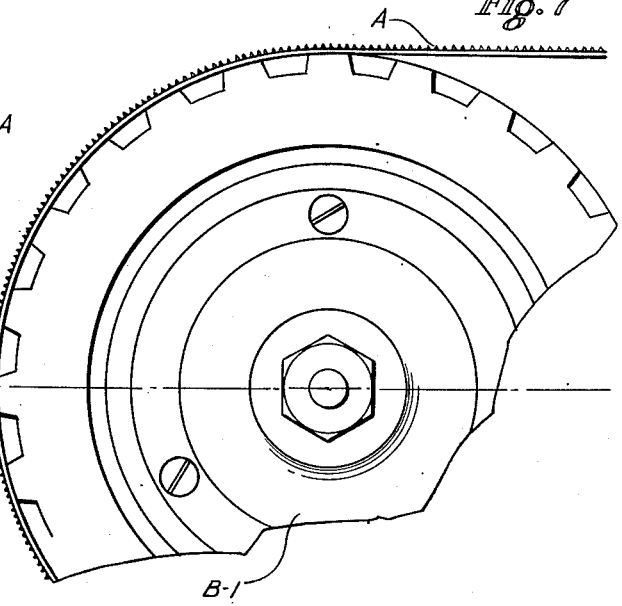
INVENTOR.
WILLIAM J. COSMOS
BY
F. D. Prager
ATT'Y Patented Mar. 30, 1954

2,673,470

UNITED STATES PATENT OFFICE 2,673,470

HIGH-SPEED, LOW-VIBRATION DRIVE PULLEY FOR FLAT BELTS

William J. Cosmos, Chicago, Ill.

Application July 30, 1952, Serial No. 301,814

5 Claims. (Cl. 74—230.7)

This invention relates to high speed drive pulleys for flat belts. The new pulley has strong resistance against dynamically unbalancing forces. At the same time it is very inexpensive and versatile.

In the past, flat belts were used mainly for power transmission, at velocities up to about 4000 feet per minute. At present, flat belts are used at much higher speed, mainly for processing purposes. Reference is made particularly to the belts of strong paper stock or the like, coated with abrasive material, for surface treatment on work pieces of steel and other metals. Work of this kind ranges from very light and fine polishing to heavy aggressive grinding of stock removal. Until recently such work was done at surface velocities up to about 8000 feet per minute. Higher velocities involved excessive vibration and even a danger of centrifugal disruption of the rim.

In order to insure traction, the rim of such a pulley must be centrifugally expandable; inherently leading to a danger of vibration and dynamic unbalance. This danger is aggravated by the localized belt pressure, and often by the even more localized and more severe pressure of work pieces. In spite of these complicating factors it is desirable, for rapid abrasion and the like, to use surface velocities which often are in the range of about 10,000 to 15,000 feet per minute or 120 to 180 miles per hour. A pulley for such surface velocities will hereinafter be called a pulley to drive a belt at high speed. In such a pulley it is particularly desirable to hold vibration to a minimum, in order to avoid heating up, marking of work pieces, and other difficulties.

The invention provides a flat-belt pulley, and component parts thereof, which for the first time allow the use of such a high speed, with high safety, high balance and high versatility, at low expense. This is achieved by a new combination of anchorage mechanisms. One such mechanism is employed between the expandable tire material and a rigid frame for the same. Another such mechanism is employed between said frame and the hub.

Figure 1 is a front elevation of a simple embodiment of this invention; Figure 2 is a side elevation of the pulley shown in Figure 1; Figure 3 is a front elevation of said pulley with the belt removed; Figure 4 is a cross section through said pulley. Figure 5 is an exploded view of a slightly modified pulley embodying this invention, in a view generally similar to Figure 4. Figure 6 is a further similar view showing another slight modification in assembled condition; and Figure 7 is a partial side elevation of the pulley of Figure 6.

An abrasive-coated paper belt A is shown as being driven by a belt driven pulley B (also called "contact wheel"), mounted on a drive shaft C, to grind or polish a work piece P. The work piece is pressed against the belt in contact with the pulley B.

The peripheral part or rim 20 of the belt pulley is made from an elastic material such as rubber of suitable hardness. It is slightly expanded centrifugally when rotating at the proper grinding speed. It contracts resiliently when rotating at lower speeds or when at rest. Such expansion is allowed for the purpose of insuring required traction on the inside of the belt B, and sometimes for the further purpose of providing resilient cushioning for the work piece P. The expansion must be controlled by interior bonding of sufficient strength, in order to avoid explosion of the expandable rim (which has heretofore occurred, damaging personnel and property). The expansion must also be controlled with uniformity, to prevent dynamic vibration, chattering or marking of the work piece (which heretofore has often spoiled the work to be ground or polished, or added to the grinding or polishing time).

For these purposes an insert ring or frame 21 of thin, rigid, metallic material such as cold-rolled steel plate, suitably formed, is inserted in the relatively thick, elastic rim 20. This insert ring is firmly bonded to said rim on the one hand and to a split hub 22 on the other hand. The bond between the rim and the insert is practically permanent so that these two parts form a unitary article. The bond between the insert and the hub can be released and re-established, without loss of dynamic balance in the pulley as an entirety.

The hub 22 for the tire 20, 21 is held on its shaft C, usually by a nut 23 compressing the cylindrical body of the hub axially against a shoulder 24 on the shaft. The hub also comprises a flange 25 outwardly extending from the cylindrical body of the hub. The entire hub is formed as an integral casting of a light metal such as aluminum, to simplify the establishment and maintenance of dynamic balance in this inner part of the wheel.

In the embodiment of Figure 4 at least one side (the left side) of the flange 25 and adjacent portions of the cylindrical body of the hub are machined to provide smooth and regular surfaces of a greater geometrical accuracy than can be obtained by casting, in order to provide a close sliding fit for the inner edge of the insert ring 21 and a smooth abutment for the side of this ring. Similar close fit is provided between said surfaces and a clamping ring or washer 27, forming the remaining part of the split hub 22.

An inner, flat, annular part or web 21-A of the insert ring 21, extending inwardly from the elastic body 20, is clamped between the flange 25 and the washer 27, by a suitable number of screws 26 engaging the parts in question. In Figure 4 these screws are threaded into the clamp ring 27 while passing through slightly oversized holes in the insert ring 21 and flange 25.

The body or outer part 21-B of the insert ring 21 forms a wide ring, extending from the outer part of the web 21-A substantially to both sides of the wheel; preferably symmetrically. This outer part is embedded in the rubber rim 20, at substantial but not necessarily equal distances from the inner and outer surfaces of said rim. The rubber and steel are vulcanized and additionally bonded together. For such additional bonding the ring body 21-B is panel-perforated by a great number of small apertures 28, extending through said body, preferably in a radial direction. The rubber of the rim extends through these apertures, filling the same. Thus, I provide an integral body of rubber which extends outside, through and inside the rigid frame or ring 21.

The shape, number and distribution pattern of the openings 28 and the shape of the rim portions inside and outside the same are subject to variation, depending on the abrasion problem involved. However, I have found it important in general that a major part of the cylindrical surface of the insert ring should be occupied by the apertures, collectively, to provide the necessary bonding strength. Further, the distribution of such apertures over said surface should be substantially uniform, and the diameter or maximum extension of each individual aperture should be minor as compared with the ring periphery but at least approaching the thickness of the inner part of the plastic rim, to provide balance along with strength. The apertures can be formed by punching, drilling or other well known processes.

The insert ring or frame itself, with a cylindrical outer part 21-B and a flat inner part 21-A, is shown as being formed from two identical sections or halves, each of which forms in substance a hollow-center dish or pan. These sections can be formed from flat material by spinning or pressing operations. The two halves are rigidly fastened together, for instance by spot-welding, before insertion in the mold wherein the rubber is molded and vulcanized on the frame 21.

It is unavoidable that a statically and dynamically unbalanced tire 20, 21 is originally formed, due to strains developed in the metal-forming process and due to the more or less viscous flow of the rubber incident to molding. Therefore the tire must be balanced. The dynamic balancing is best effected by installing the tire upon a hub 22 previously separately balanced in known manner, at and for the speed in question. The hub and tire are then rotated at said speed, zones of excess mass are determined by known procedures, and excess material, for instance excess metal of the web 21-A is removed, for instance by drilling out as diagrammatically shown at X.

The outer surface of the elastic rim 20 may be specially formed or serrated to obtain desired ventilation and flexing of the abrasive belt A. For instance I may form alternating grooves 34 and ridges or land areas 35. Usually the serrations extend diagonally across the working surface, at some predetermined angle depending on the specific use of the wheel. The grooves 34 are shown as being somewhat wider than are the land areas 35, but many modifications are possible in this respect; also regarding the exact forms and angularities of land surfaces, their leading and trailing edges 36, 37, and their various corners, etc. Preferably the original serrations 34, 35 are molded into the elastic rim 20 and made sharp-cornered by the dressing of the rim, prior to balancing.

The inside surface of the elastic rim 20 preferably has the shape of a smooth solid of rotation such as an outwardly flaring cone frustum. The advantage of such a smooth outwardly expanding shape is that particles of dust, abrasives, metal chips, etc., are removed from the rotating wheel by a positive but gentle and distributed centrifugal air flow. Without this feature such particles are driven into localized inside portions of the sides of a wheel; and accumulations of such particles tend to become irregular, thereby disturbing the dynamic balance.

I also prefer the use of countersunk and flat-headed screws 26 as shown, in the assembly of the split hub with the rim. Likewise I prefer the use of a hub and rim, the sides of which are generally smooth. Machining of the outer flange and clamp ring side surfaces is usually not necessary, but reasonably smooth casting surfaces are desirable.

Relatively rapid air flows are induced by and through the serrations on the outside of the rim, in order to cool the rim and the belt.

The rapid rotation of the wheel which causes the different air flows gives rise additionally to a small but definite flow of the elastic rim material, due to centrifugal expansion thereof. This flow starts as rotation begins. It should come to an end when rotation has been established at a predetermined designed velocity, such as 12,000 surface feet per minute, for which the wheel is dynamically balanced. However, dynamically unbalancing forces are at work with respect to the expanded rim, even when the different parts of the wheel are strictly coaxial, as they should be. Such forces are largely due to the partial restraint of the rim by the flat belt, and often also due to the localized pressure of work pieces, applied in angularly and laterally shiftable areas of the working surface. Therefore reversible flows of the elastic material, at a frequency determined by the number of revolutions per minute, are unavoidable. This in turn leads to a gradual and generally irregular heating up of the rim material, which affects the dynamic balance even in the absence of further localized pressures and thereby leads to further vibratory flows.

It is desirable to minimize such reversible and vibratory flows of the elastic material, not only because of the obvious dangers of heating up and softening the rubber, but also because of attendant noise, vibration and, in aggravated cases, chattering of the belt on the work piece.

A sufficient control over such reversible and vibratory flows is obtained, in a most economical manner, by the panel-perforated ring 21. It is important that this ring be rigid but thin, thereby avoiding the presence of long, widely extendable rubber anchorage extensions. It is also important that the ring be made of metal, a good conductor of heat, to keep temperatures uniform within the rim 20.

Particular attention is directed to the removable and interchangeable nature of the tire 20, 21. This feature is desirable even in the event that the user requires only tires 20, 21 of a single type and size. Heretofore attempts were made to obtain economy by making the expandable rim thick enough for a substantial number of resurfacing operations. However, this produced high dynamically unbalancing forces, since the exact nature of belt and work piece pressures, and the exact degree of resulting heating up is unpredictable. I found it preferable to minimize the dynamically unbalancing forces, and to obtain economy rather by using a disposable tire unit 20, 21, comprising only insignificant amounts of material aside from the working rim surface itself and formed by simple, inexpensive processes.

Preferably, therefore, the outer part of the rim 20, outside the frame 21, has a thickness, exclusive of serrations, comparable with the maximum extension of the anchor holes 28. The inner part of the rim may have a similar thickness, at the sides of the wheel.

One or two resurfacing operations are usually possible, and sometimes desirable, even on such a tire of limited thickness; however the new construction has the advantage that it is no longer economically necessary to ship an integral, heavy balanced wheel to a surfacing shop and back to the user. The handling and shipping costs were a large part of the maintenance expense, in the past; this has been reduced while the efficiency of the wheel has been increased and the first cost at least not varied.

In the form of Figure 4 the insert ring 21 has a substantially T-shaped radial cross section. It is possible, instead, to make said section slightly Y-shaped, as shown in Figure 6. In either case the body of the ring 21 is at least approximately cylindrical, and approximately as wide as the belt A.

Said cross-section of the insert ring may have either a relatively long central leg as shown in Figure 4, or a relatively short central leg as shown in Figures 5 and 6. A longer central leg provides an extensive clamping surface. On the other hand, the shorter leg not only saves material but also facilitates the avoidance of warping in the inwardly extending web, thereby maintaining dynamic balance more easily.

The hub 22-A of Figures 5 and 6 has a flange 25-A with two annular shoulders and grooves 29, 30 concentrically machined upon its outermost part. The shoulder of the outermost groove 29 has close concentric sliding fit with the web of the insert ring, while the shoulder of the next inner groove 30 has similar fit with the clamp ring 27-A. In this case the screws 26 are best located interiorly of the mounting flange of the tire, as shown.

This application is a continuation in part of application Serial No. 257,597, filed November 21, 1951.

I claim:

1. A removable, high speed, low vibration pulley tire to drive a flat belt, comprising a ring of thin, rigid metal having approximately cylindrical shape and being approximately as wide as the belt to be driven, with an integral, substantially flat, annular web extending substantially radially inwardly from the body of the ring, coaxially therewith; and a rim of elastic molded material bonded to said ring over the entire approximately cylindrical extension thereof, at least an innermost, annular part of said web being free from any such elastic molded material bonded thereto, and the tire, composed of said ring and rim, being dynamically balanced for a predetermined high speed, whereby said tire can be interchangeably mounted upon a hub dynamically balanced for said predetermined speed and vibration of the interchangeably combined tire and hub is minimized.

2. A tire as described in claim 1 wherein said rim is bonded both to the inside and outside of said ring.

3. A tire as described in claim 2 wherein said ring is panel-perforated over its entire substantially cylindrical extension and the material of said rim extends through the panel perforations.

4. A tire as described in claim 1 wherein the inside surface of the rim has a smooth form outwardly expanded toward the side of the tire.

5. A tire as described in claim 1 wherein the outside surface of the rim has serrations formed therein and extending diagonally across the rim from one side thereof to the other.

WILLIAM J. COSMOS.

References Cited in the file of this patent

UNITED STATES PATENTS

| Number | Name | Date |
|---|---|---|
| 226,013 | Allen | Mar. 30, 1880 |
| 986,930 | Mervine | Mar. 14, 1911 |
| 1,027,639 | Bowen | May 28, 1912 |
| 1,765,402 | Carter | June 24, 1930 |
| 1,808,440 | Thomas | June 2, 1931 |
| 2,417,467 | Bryant | Mar. 18, 1947 |
| 2,495,459 | Kessler | Jan. 24, 1950 |